(12) United States Patent
Beaulieu et al.

(10) Patent No.: US 7,144,501 B2
(45) Date of Patent: Dec. 5, 2006

(54) SKIMMER CONSTRUCTION

(75) Inventors: Edgar Beaulieu, Sugar Grove, IL (US); David R. Kelly, St. Charles, IL (US)

(73) Assignee: Aquascape Designs, Inc., St. Charles, IL (US)

( * ) Notice: Subject to any disclaimer, the term of this patent is extended or adjusted under 35 U.S.C. 154(b) by 56 days.

(21) Appl. No.: 10/854,816

(22) Filed: May 27, 2004

(65) Prior Publication Data

US 2005/0263446 A1    Dec. 1, 2005

(51) Int. Cl.
    *C02F 1/00* (2006.01)
(52) U.S. Cl. ............... 210/167; 210/170; 210/232; 210/416.1
(58) Field of Classification Search ........ 210/167, 210/169, 170, 232, 416.1, 416.2, 448
    See application file for complete search history.

(56) References Cited

U.S. PATENT DOCUMENTS

| | | | | |
|---|---|---|---|---|
| 3,080,060 A | * | 3/1963 | Blumenkranz et al. | 210/169 |
| 3,306,448 A | * | 2/1967 | Baker | 210/121 |
| 3,537,111 A | * | 11/1970 | Whitten, Jr. | 4/508 |
| 3,616,918 A | * | 11/1971 | Diemond et al. | 210/169 |
| 4,498,984 A | * | 2/1985 | Colson | 210/122 |
| 5,584,991 A | | 12/1996 | Wittstock et al. | |
| 5,814,213 A | * | 9/1998 | Glasgow | 210/104 |
| 6,054,045 A | | 4/2000 | Wittstock et al. | |
| 2002/0175117 A1 | * | 11/2002 | Ouwinga | 210/242.1 |
| 2003/0196941 A1 | * | 10/2003 | Danner | 210/169 |
| 2004/0226896 A1 | * | 11/2004 | Lovestead et al. | 210/776 |
| 2005/0098488 A1 | * | 5/2005 | Kelly et al. | 210/151 |

FOREIGN PATENT DOCUMENTS

FR    2736344    * 1/1997

* cited by examiner

*Primary Examiner*—Fred G. Prince
(74) *Attorney, Agent, or Firm*—James B. Conte; Barnes & Thornburg LLP

(57) ABSTRACT

A decorative pond which includes a pond area, a water feature for discharging water into the pond and a skimmer construction for receiving pond water, separating debris from the pond water and recirculating filtered water to the water feature. The skimmer construction includes: a housing which defines a fixed pond-water receiving aperture, an internal assembly positioned adjacent the fixed aperture defines a movable pond water receiving aperture that is selectively positionable relative to the fixed aperture. The combination of the fixed and movable apertures define an inlet opening to the skimmer for receipt of pond water in said housing. A debris collection member is positioned rearwardly of the inlet opening to receive incoming pond water from the inlet opening so as to collect debris. A controllably positionable discharge assembly is provided in association with the skimmer construction so as to permit control of water levels in the skimmer.

25 Claims, 9 Drawing Sheets

FIG. 4
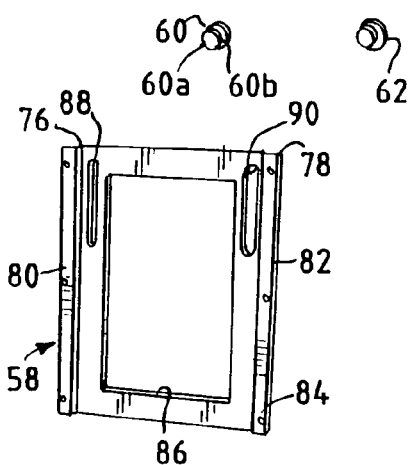
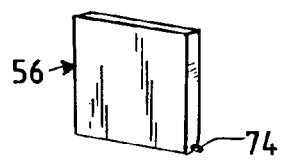
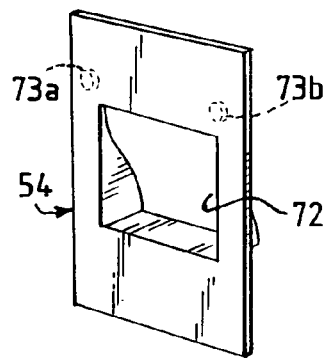
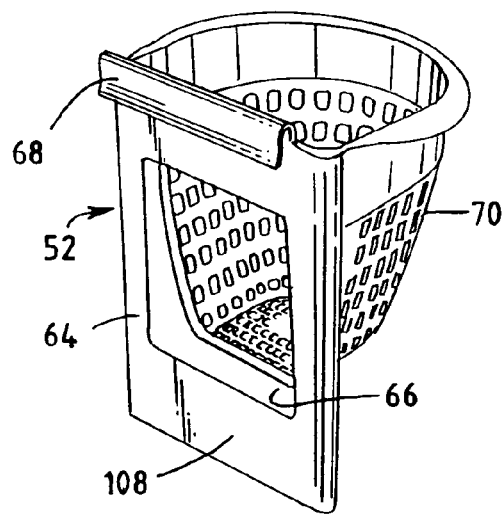

FIG. 8
FIG. 9
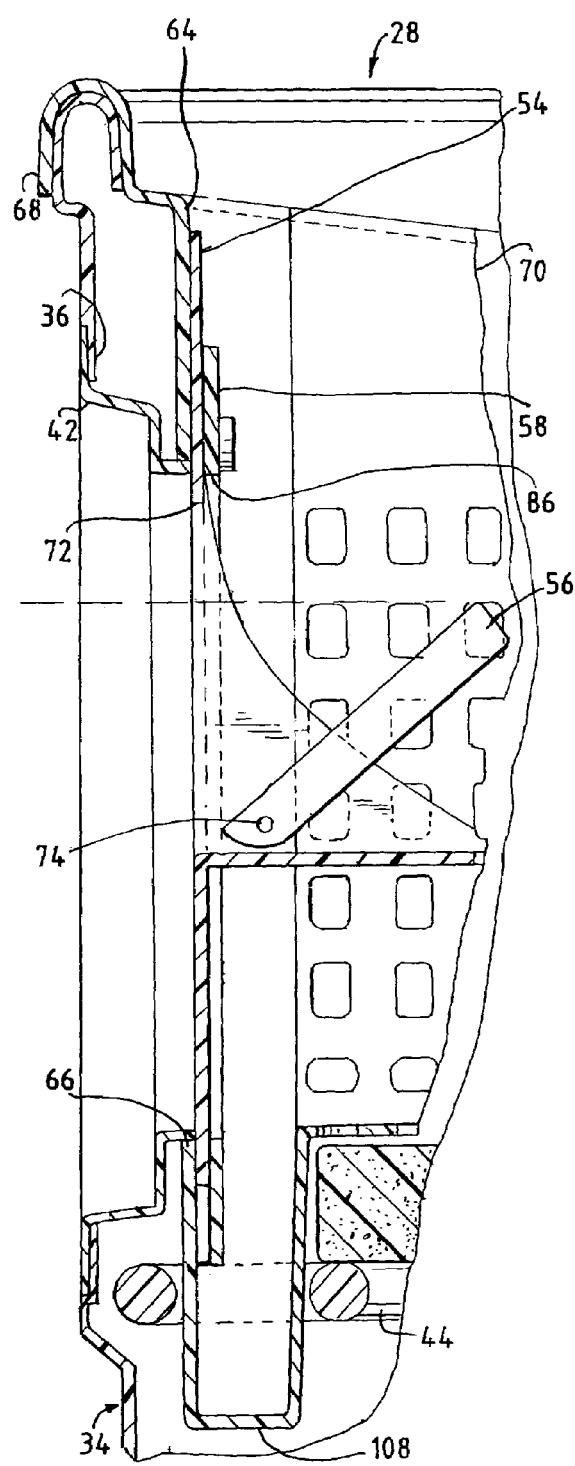
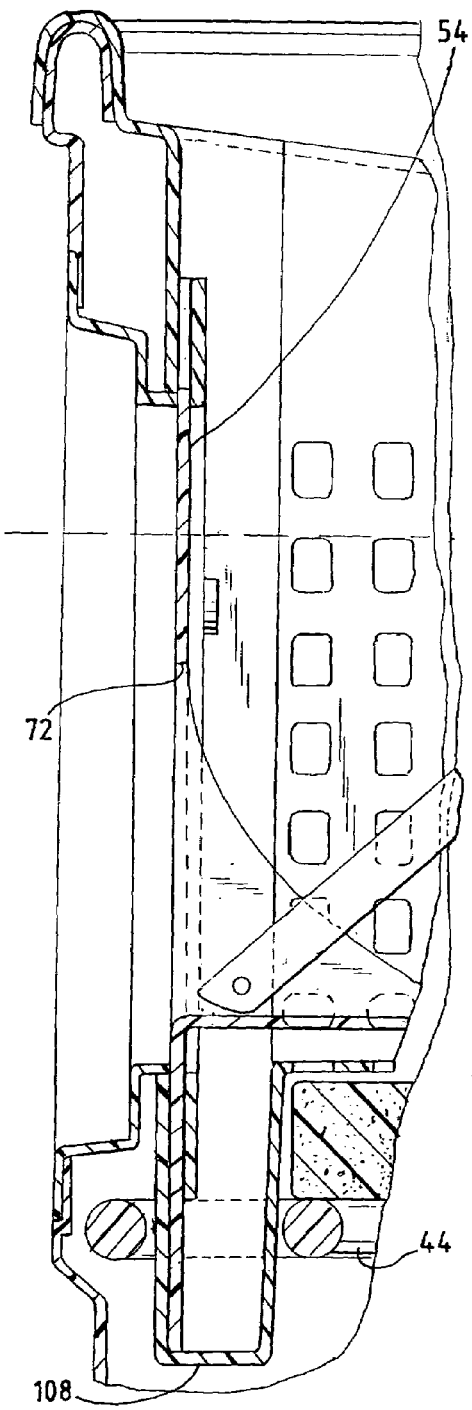

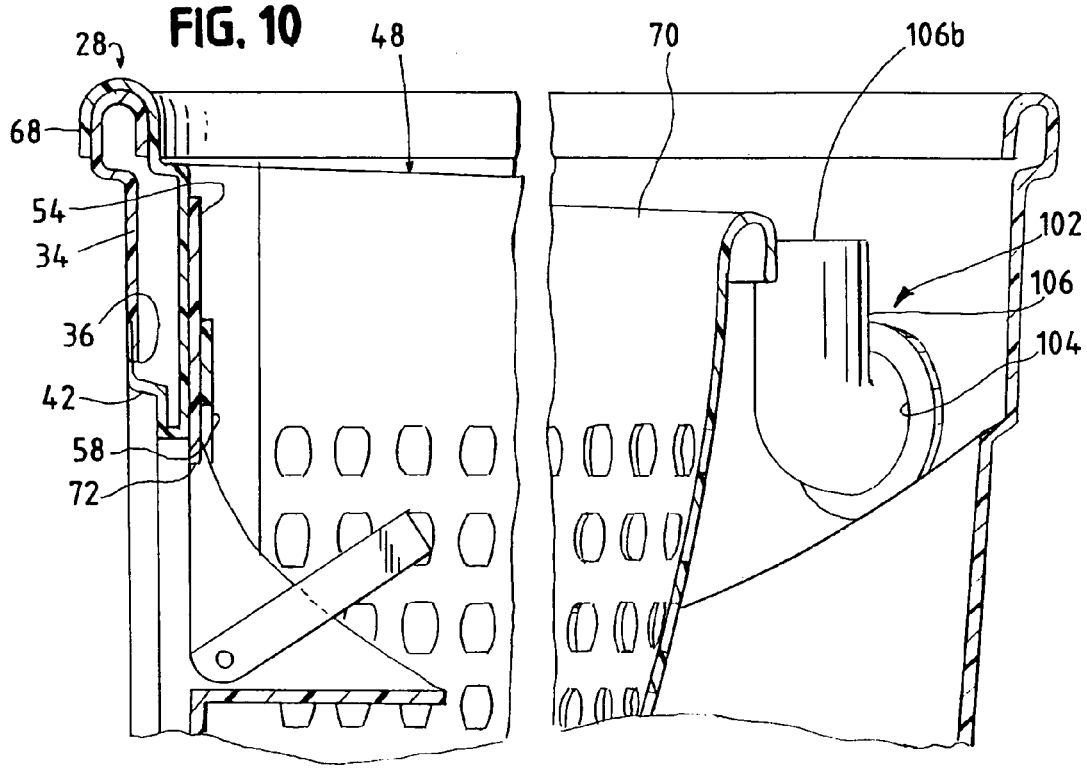
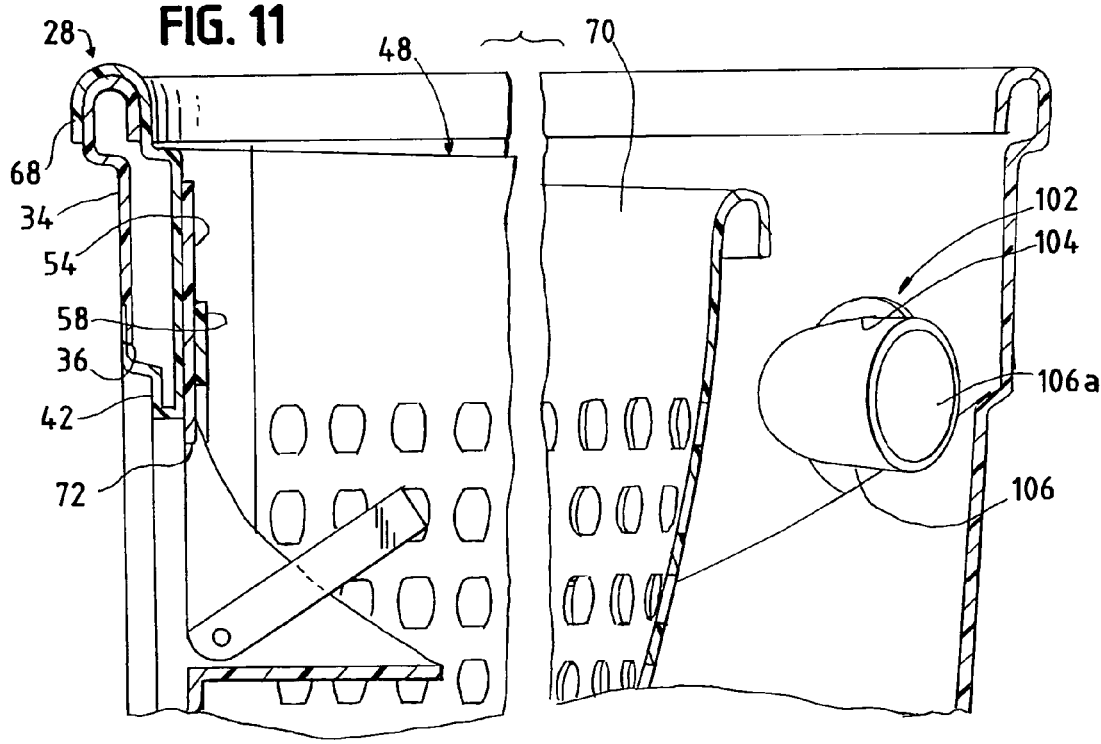

SKIMMER CONSTRUCTION

FIELD OF THE INVENTION

This invention relates to a skimmer construction, and more particularly to a skimmer construction of the type used in connection with decorative ponds and having an adjustably positionable inlet opening.

BACKGROUND OF THE INVENTION

Decorative ponds have become very popular. Such ponds are formed by an excavation and include a body of pond water which fills the excavation and into which a water feature discharges recirculated, filtered and oxygenated water. See for example, U.S. Pat. No. 5,584,991. This can be accomplished with a waterfall-like construction. A unit known as a Biofalls is frequently used to recirculate pond water, filter the same and discharge the filtered water in a falling or water-fall style back into the pond.

A skimmer assembly as seen in U.S. Pat. Nos. 5,584,991 and 6,054,045 has also been provided to receive water from the pond upon which debris (such as leaves and twigs) may be floating, remove the floating debris from the pond water, provide some filtration and recirculate the received pond water to the water feature. A pump is positioned in the skimmer assembly on the bottom wall for the recirculation.

In general, the skimmer assembly includes a housing or box which is positioned in an excavation, defines an inlet opening that is rectangular and fixed in position with its upper surface spaced slightly above the incoming water so as to provide a space through which floating debris can enter the skimmer housing for subsequent separation and filtration. This space or gap has been on the order of ¾ of an inch. If the space is less, then the floating debris may not enter the skimmer and if the space is greater, then the inlet may be too high and can impact the volume of water flowing into the skimmer assembly.

Proper positioning of the inlet opening has been achieved using a surveyor's transit or other leveling device. If the top of the inlet opening was determined to be too low, the entire skimmer assembly was raised by removal of the skimmer assembly from its excavation, backfilling of the space under the skimmer assembly and repositioning the skimmer assembly in the excavation on the backfilled material so as to achieve the correct spacing. On the other hand, if the top of the inlet opening is too high, (e.g., the bottom of the inlet opening is too low) the skimmer assembly would be removed, the skimmer assembly space re-excavated to lower the skimmer assembly and the skimmer assembly replaced in the excavation at the correct height. This leveling, repositioning and releveling of the skimmer assembly can be a complex and time-consuming operation.

Thus, it is desirable to provide a skimmer assembly which does not require repositioning of the skimmer assembly to properly position the inlet opening.

Moreover, the skimmer assembly usually includes a fixed discharge or overflow where the water level in the skimmer assembly and thus the pond is limited to a particular level, depending upon the position of discharge.

It is also desirable to provide a variable and controllable discharge or overflow mechanism which permits control of the water level in the skimmer assembly.

In addition, skimmers also include a filter mat which filters incoming water which is then delivered to a pump that in turn directs the filtered water to the water feature. The filter is thus positioned between the incoming pond water and the pump. The pump may be positioned either at a horizontal or vertical orientation or may be at some orientation therebetween.

It is another object of this invention to provide a skimmer assembly which can accommodate a filter in a horizontal, vertical or angular position.

These and other objects of this invention will become apparent from the following description.

SUMMARY OF THE INVENTION

There is provided by this invention, a skimmer construction which includes an adjustably positionable inlet opening so as to eliminate the need to reposition the entire skimmer construction in order to position the opening. In general, the opening is defined by several apertures which include a fixed aperture in the skimmer housing and an internal assembly that defines a vertically movable and positionable aperture which is positioned adjacent the fixed aperture. The combination of the fixed aperture and the movable aperture defines the inlet opening and the position of the inlet opening. A filtration basket associated with the internal assembly is positioned relative to the opening to receive incoming pond water and filter debris therefrom.

A variably positionable discharge opening is provided in the housing. The opening is positioned above the top of the fixed inlet aperture. A "J" shaped elbow is secured to the discharge opening and is generally movable, about a horizontal axis, between a horizontal and a vertical position. The portion of the elbow attached to the discharge port is the outlet and the inlet is defined by the other end of the elbow.

Moreover, the skimmer is capable of cooperating with a filter mat in a horizontal, vertical or angular orientation so as to receive incoming pond water, filter the same for delivery to a pump which then expels the filtered water from the skimmer and to the water feature.

BRIEF DESCRIPTION OF THE DRAWINGS

FIG. 4 is a perspective and exploded view showing components of the internal assembly;

FIG. 8 is a fragmentary and vertical sectional view of a portion of the skimmer construction showing the movable aperture in a raised position;

FIG. 9 is a fragmentary and vertical sectional view of a portion of the skimmer construction with a movable aperture in a lowered position;

FIG. 10 is a fragmentary and vertical sectional view of the top portion of the skimmer construction showing the discharge assembly in a raised position; and FIG. 11 is a fragmentary and sectional view of the top portion of the skimmer construction showing the discharge assembly in a lowered position.

DESCRIPTION OF THE PREFERRED EMBODIMENT

Figure 1:
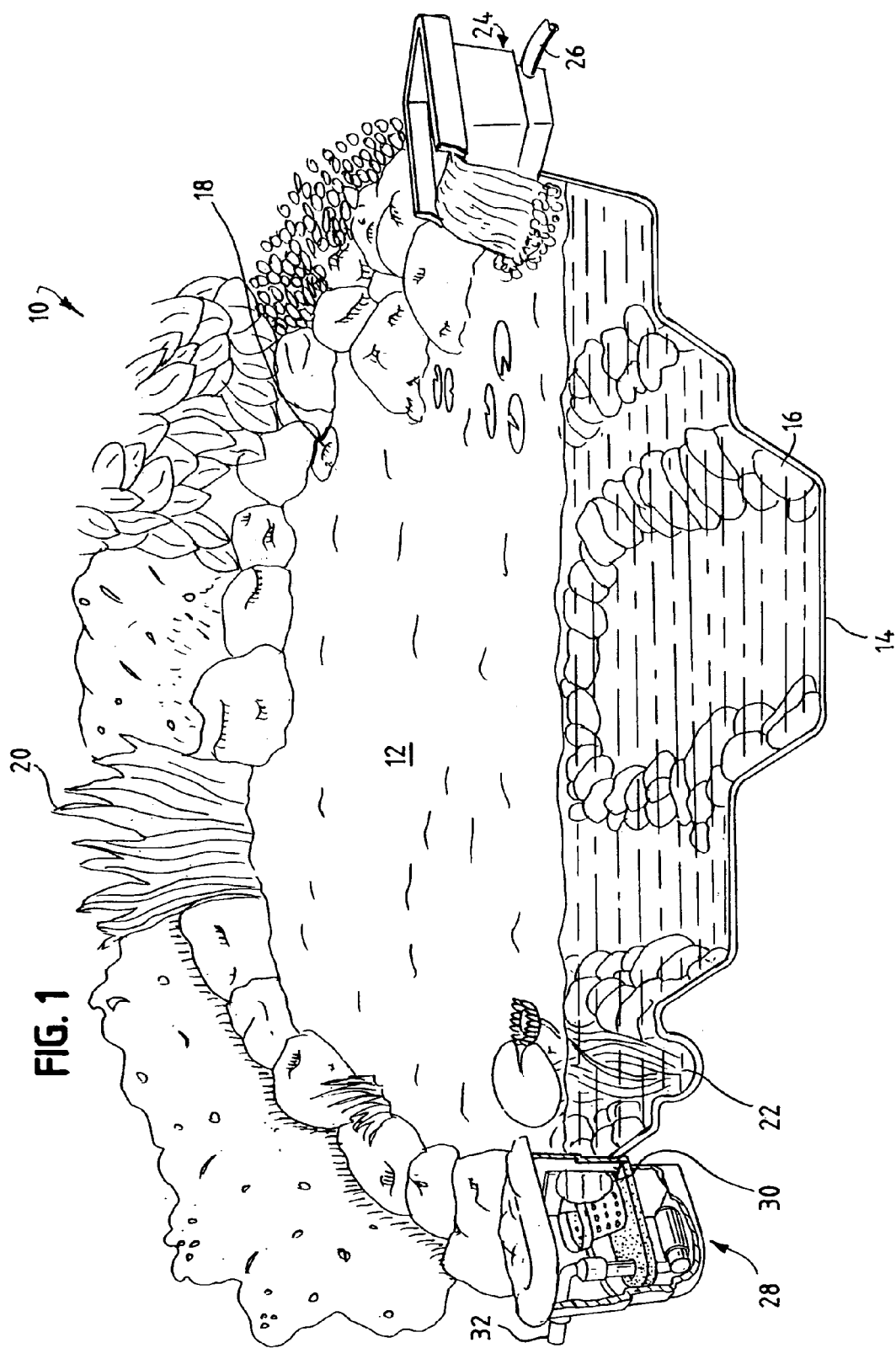
FIG. 1 is a schematic and partially sectional view showing a decorative pond system.

Referring to FIG. 1 there is shown a decorative pond system 10 generally which includes a body of water 12 which fills an excavation. The excavation is provided with a liner 14 and appropriate rocks or gravel 16 and 18. Appropriate vegetation, 20 and 22 is also provided. The pond system includes a waterfall filtration system such as 24 and shown in U.S. Pat. No. 5,584,991. An inlet pipe 26 is shown whereby pond water is recirculated to the bottom of the waterfall 24. A skimmer construction 28 (which is sometimes referred to as the skimmer box and rests in an excavation), is shown, and includes an inlet opening 30 whereby pond water enters the skimmer construction, is filtered and recirculated therefrom. A skimmer recirculation pipe 32 directs incoming pond water into the waterfall pipe 26. It will be appreciated that this system provides a closed recirculation system whereby undesirable materials can be filtered from the water and refiltered water returned to the pond.

Figure 2:
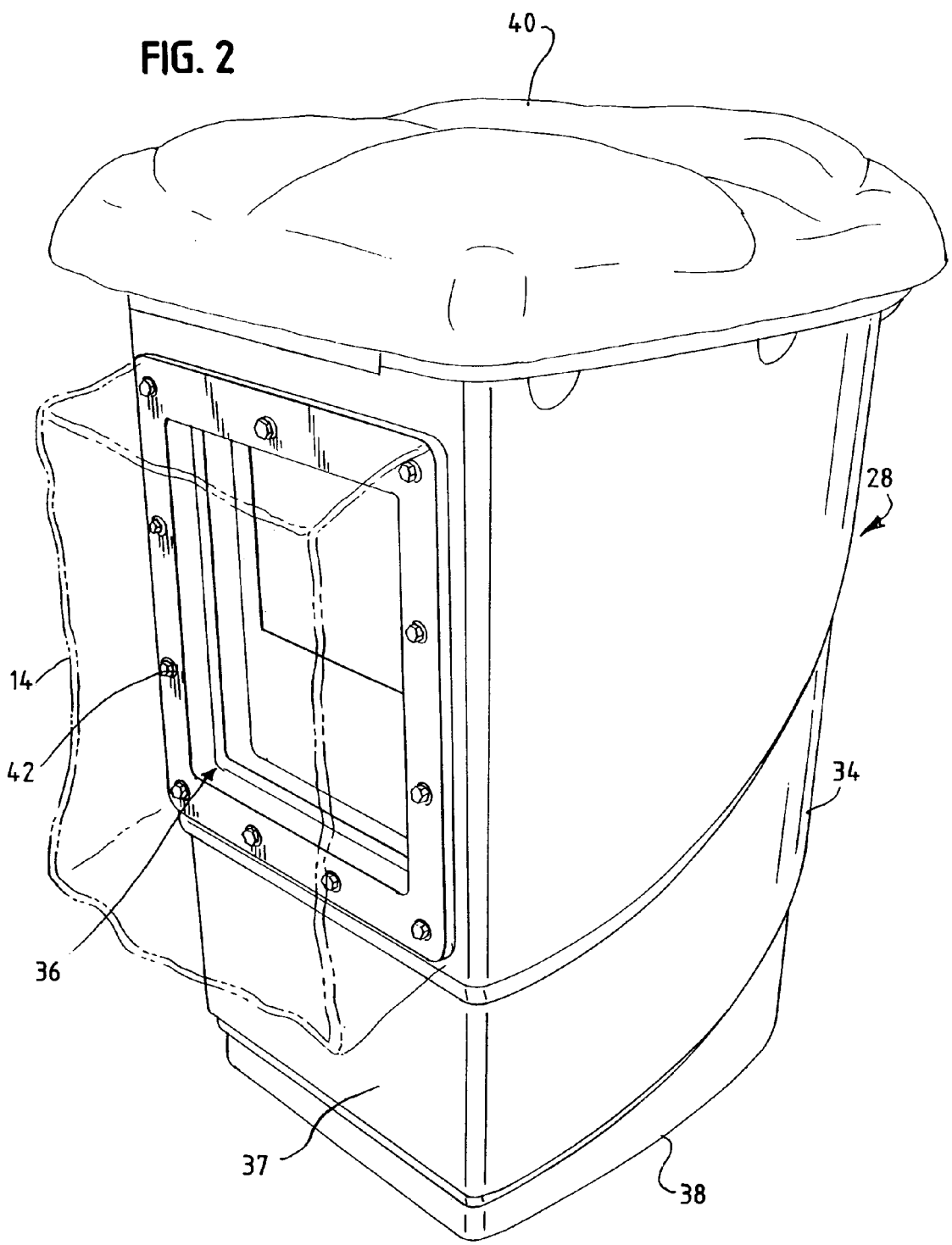
FIG. 2 is a perspective view of the exterior of a skimmer construction showing the inlet opening.

The exterior of the skimmer construction is shown in FIG. 2. The construction includes a shaped and somewhat box-like housing 34 that defines a fixed inlet aperture 36 in the front wall 37 of the housing. A bottom wall 38 is also provided. The housing is hollow or box-like shaped and includes an open top which is covered by faux stone cover 40 which is intended to hide or camouflage skimmer in the vegetation-like setting. A frame 42 is provided for bolting to the housing about the fixed inlet aperture 36. The plastic liner 14 is positioned about the aperture 36 and is trapped and bolted in place using the frame 42. open top which is covered by faux stone cover 40 which is intended to hide or camouflage skimmer in the vegetation-like setting. A frame 42 is provided for bolting to the housing about the fixed inlet aperture 36. The plastic liner 14 is positioned about the aperture 36 and is trapped and bolted in place using the frame 42.

Figure 3:
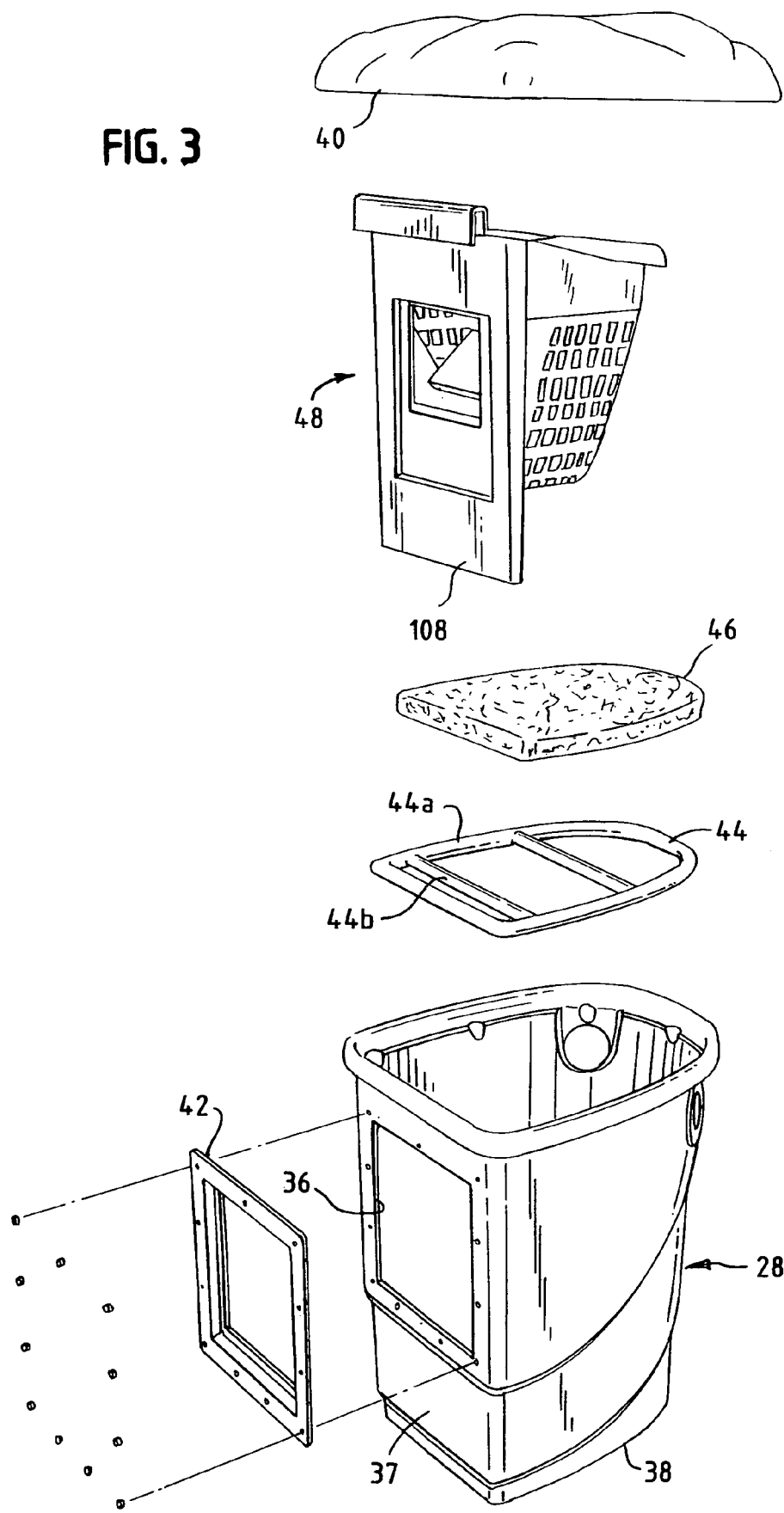
FIG. 3 is a perspective and exploded view showing components of the skimmer construction.

Referring now to FIG. 3, the construction 28 is shown with a fixed inlet aperture 36 and the frame 42. A filter frame 44 is provided to rest on an interior ledge 45 (see FIG. 6) that is molded in the housing between the bottom wall 38 and the bottom edge of the fixed opening 36. A filter mat 46 which is slightly shorter than the filter frame 44 rests on the frame. The mat is shorter than the frame at its front end. The filter frame defines a slot at its front end.

It will be appreciated that in addition to components (i.e., ledge, filter frame and filter mat) that define a horizontal position for the mat, those components can be modified or other components can be provided to permit the mat to be positioned vertically or at an angular position between the horizontal and vertical.

The internal assembly 48 is shown in FIG. 3 and is shown disassembled in FIG. 4. The faux cover 40 is shown and is fabricated of a foam material in the shape of faux stone so as to enhance the camouflaging of the skimmer construction in the vegetation setting.

The internal assembly 48 is shown in exploded fashion in greater detail in FIG. 4. Referring to FIG. 4, the internal assembly includes the following major components. The front face and basket assembly 52, the adjustable or movable aperture plate 54, the hinged weir plate 56, the adjustment plate 58 and the adjustment or thumb screws 60 or 62.

The front surface and basket assembly includes a front face 64 or portion which has a back surface which defines an aperture 66 and a skimmer housing engaging lip 68 at the top thereof. A debris-receiving basket 70 integral with the front face is provided below the lip 68, behind the front face 64 and surrounds the aperture 66 on three (3) sides.

The adjustable aperture plate 54 defines a vertically adjustable or movable inlet aperture 72 which is smaller than each of the fixed aperture 36 and the aperture 66. The plate 54 and the movable aperture 72 are positioned relative to the back surface of the front face 64 so as to be movable vertically The adjustment plate 58 has along each side edge, a stepped shoulder-like construction 76 or 78. A pair of edges 80 and 82 are provided for engagement with the back surface of the front face 64 by a screw-like system. The plate also defines a large fixed aperture 86 and a plurality of vertically elongated adjustment slots 88 and 90 which are generally parallel to the edges 80 and 82.

A pair of adjustment holes 73A and 73B are provided on the back of the adjustable aperture plate 54 for engagement by the adjustment or thumb screws 60 and 62. It is seen that the apertures or bosses 73A and 73B are open at the back end of the adjustable aperture plate, extend toward the front thereof and are closed at the front thereof. In the alternative, threaded sleeves or bosses can be positioned at the holes 73A and 73B to receive thumb screws 60, 62. The thumb screws 60, 62 include a shank portion such as 60A and a head portion such as 60B. The shank portion fits through the slot such as 88 and engages an hole such as 73A and the head engages the back of the adjustment plate so as to permit the aperture plate 54 to be moved relative to the adjustment plate 58.

Figure 5:
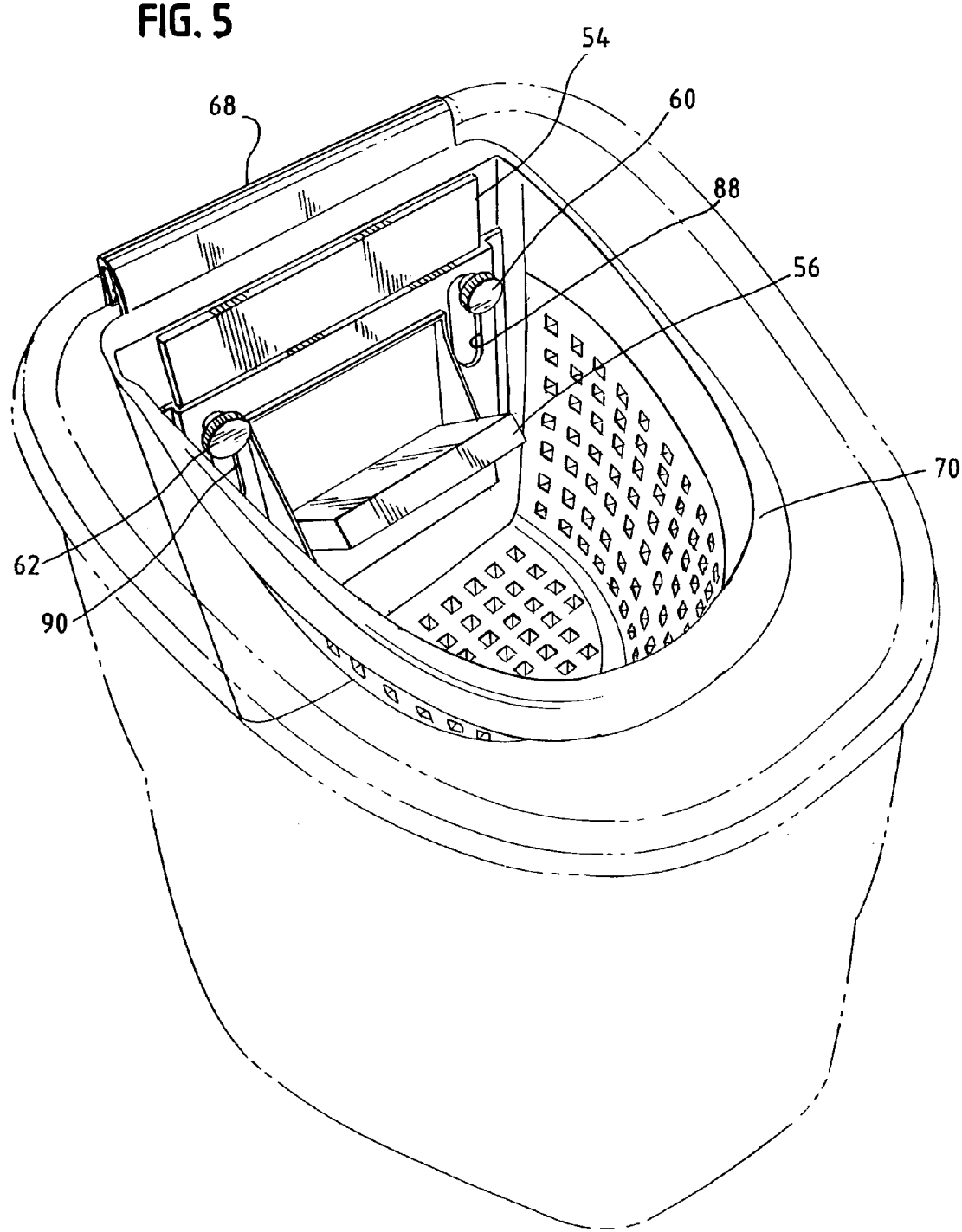
FIG. 5 is a top perspective style view showing the internal assembly for moving the movable aperture.
Figure 6:
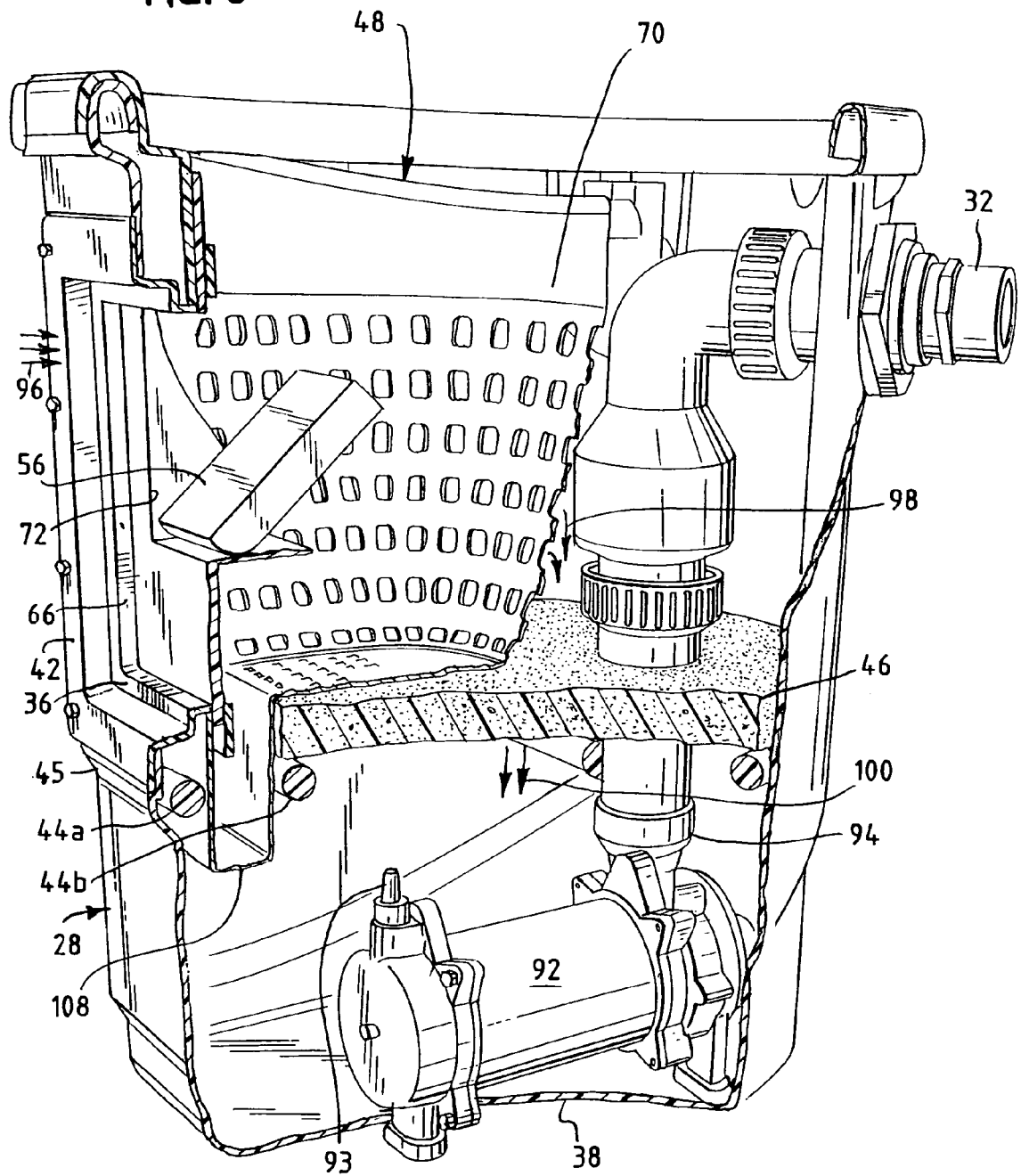
FIG. 6 is a fragmentary, sectional and vertical view of the interior of the skimmer construction.

When assembled, the weir plate 56 fits within the aperture 72 in the adjustable aperture plate and the adjustable aperture plate is held in position by the adjustment plate 58 which is secured (i.e., screwed) to the front face along the edges 80 and 82. The adjustable aperture plate 54 is vertically movable with respect to the front face 64 and the aperture 66 by virtue of loosening the screws 60, 62, moving the aperture plate 54 relative to the adjustment plate and resecuring the aperture plate by tightening the screws 60 and 62. It is appreciated that the entire inlet assembly 48 is removably positioned in the skimmer as shown in FIG. 5 and FIG. 6 and relative to the inlet 36 by the skimmer lip construction 68. In other words, the assembly 48 hangs by the lip 68 on the skimmer housing. This is best seen in FIG. 5. The inlet assembly 48 can also be removed by lifting the inlet assembly and disengaging the lip.

Referring now to FIG. 6, the skimmer construction 28 and internal inlet assembly 48 are seen and a horizontal pump 92 is shown resting on the skimmer bottom wall 38. The pump outlet pipe 94 is shown exiting the pump, extending upwardly through the filter mat and out of the skimmer construction 28. It will be appreciated that the pump outlet is connected to the skimmer pipe 32. Power is supplied to the pump 92 via line 93.

The foregoing structure describes a horizontal pump positioned on a bottom wall with a horizontal filter mat positioned horizontally above the pump. However, the skimmer can be appropriately modified and constructed for use with a vertical pump where the pump is vertically positioned. The filter mat is vertical and positioned between the incoming pond water and the pump so as to filter the incoming water before it is received by the pump. Of course, angular orientations of the filter mat between the horizontal and vertical can be accommodated.

In operation, pond water, indicated by arrows 96, enters the skimmer from the pond. The water flows through the frame 42, the fixed opening 36, the movable or adjustable inlet aperture 72 against the weir plate 56 and the adjustment plate aperture 86, into the debris basket 70. At the debris basket, large floating debris such as twigs, leaves, etc., are collected and the received pond water is filtered to some extent. The initially filtered water is indicated by arrows 98 and flows from the basket through the filter mat 46. There the water 100 enters the horizontal pump and then exits via outlet 94.

Figure 7:
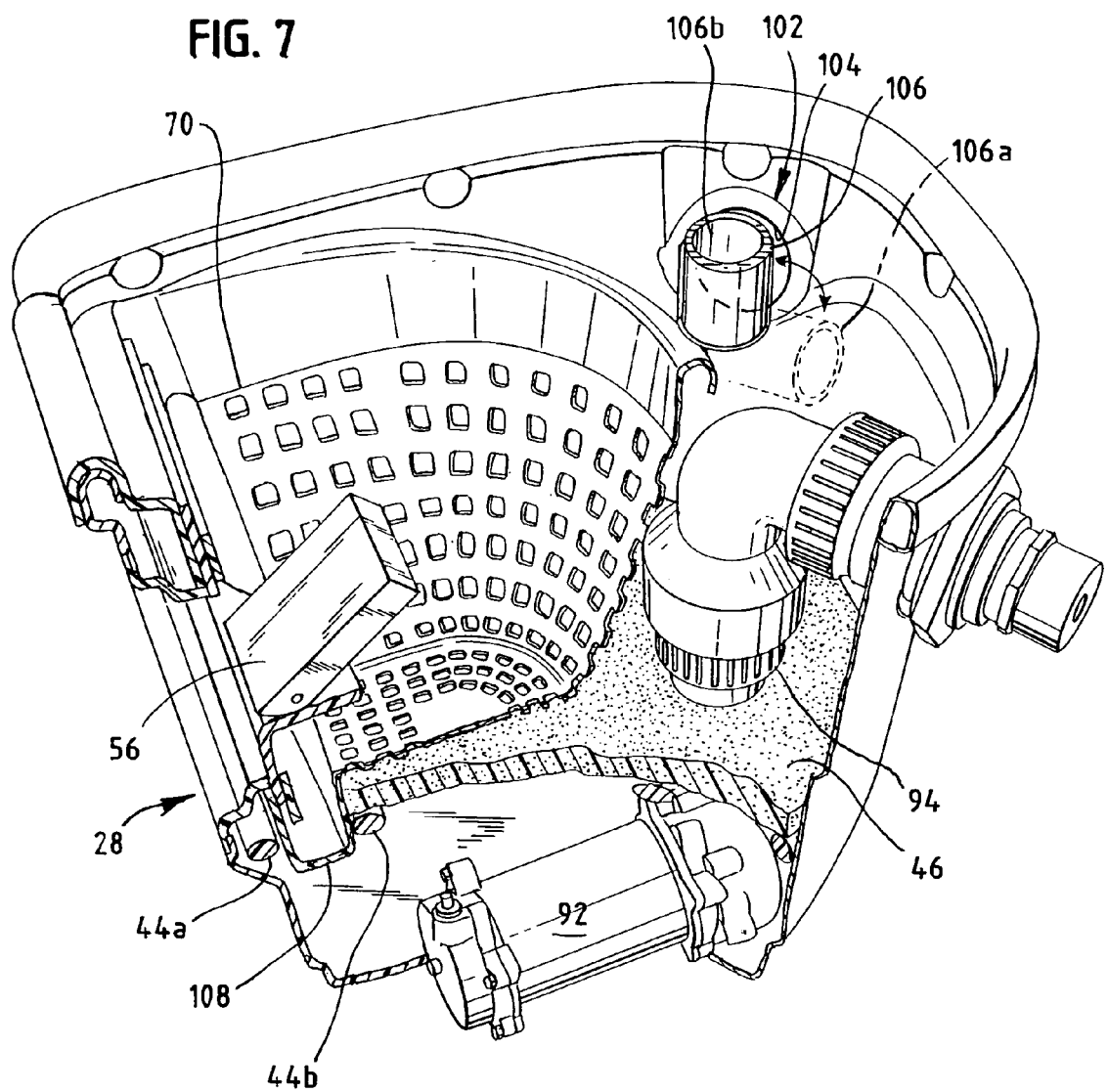
FIG. 7 is a fragmentary, sectional and perspective view of the interior of the skimmer construction.

Referring now to FIG. 7, which is similar to FIG. 6, but viewed at a different angle. The same components as in FIG. 6 are seen in FIG. 7. In addition there is shown the discharge assembly 102. The discharge assembly includes a discharge port 104 in the sidewall of the skimmer housing 34 and a rotatable "J" shaped elbow 106 that is fitted to the aperture 104 and is rotatable between substantially horizontal and vertical positions. The aperture 104 is circular and positioned such that the bottom of the aperture 104 is about ¾ inch above the top of the fixed inlet aperture 36. The purpose of the discharge is to permit draining of the skimmer construction and the pond in the event the water fills to an undesirably high level, such as the top edge of the housing 34. Thus, water above the top edge of the aperture 104 will flow into the discharge aperture and exit therefrom. In order to provide some control as to the water level, the rotatable or "J" shaped pipe 106 is provided. In the substantially horizontal position shown by the dotted lines, reference numeral 106A, the pipe will receive water which is at or above the top of the inlet aperture. However, the elbow can be rotated to a substantially vertical position, as shown in solid line and by reference numeral 106B. There entry to the elbow has been raised to a higher position and overflow water is permitted to rise above the top edge of the inlet aperture and exit via the discharge.

As indicated above, the filter frame 44 includes a front slot defined by the peripheral frame member 44A and the cross member 44B. The frame thus defines a small slot-like opening between the front edge of the frame and the cross member 44B. The slot is positioned to receive the bottom edge 108 of the front face. This stabilizes the entire internal assembly so as to hang by the lip from the housing 34 and be positioned against the front of the housing 34 and the aperture 36. This is done by the bottom edge 108 fitting within the slot formed by 44*a* and 44*b* of the filter frame.

Turning now to FIG. 8, the skimmer construction 28 includes the skimmer housing 34 and internal assembly 48. The internal assembly 48 is mounted to the skimmer housing 34 by the lip 68. The housing fixed aperture 36 and the aperture plate or frame 42 are seen. The inlet assembly plate aperture 66 is shown and is approximately the same size as the frame 42. The movable plate 54 is against the front face 64. The movable plate defines the movable aperture 72 which is seen in a raised position in FIG. 8. The adjustment plate 58 engages the movable plate 54 and is secured to the rear of the front face 64. The aperture for the adjustment plate 58 is shown with numeral 86. It will be appreciated that the movable plate 54 and thus the aperture 72 can be moved up and down against the front surface and inside the skimmer construction. The bottom section 108 of the front surface 64 and basket 70 form a trough-like section that fits within the slot of the filter frame 44 and receives the movable plate 54 as it moves up and down.

In the event a vertical pump and filter mat were used, the skimmer housing would be appropriately modified so as to maintain the functionality of the internal assembly.

In FIG. 8, plate 54 is shown in a raised position near the top of the trough/bottom edge 108.

Referring now to FIG. 9, the movable aperture 72 is shown in a lowered position. There the plate 54 extends down into the bottom section or trough 108 so as to effectively lower the aperture 72. Thus, it is appreciated that the aperture can be raised or lowered as needed and with respect to the water level of the pond itself so as to permit floating debris to enter the skimmer construction and be filtered by the basket 70.

Referring now to FIGS. 10 and 11, skimmer construction 28 is again shown along with the housing 34. The assembly 48 is shown mounted to the skimmer housing 34 by the lip 68. The controllable discharge 102 is shown in FIG. 10. There the discharge is shown as including the aperture or port 104 and the "J" shaped elbow 106. The elbow 106 is in the upright or vertical position. It will be appreciated that the water level in the skimmer 28 and the pond cannot be higher than the top or inlet 106*a* of the elbow.

Turning now to FIG. 11, the discharge assembly and particularly the discharge elbow 106 is shown as rotated from a vertical position, as in FIG. 10, to a horizontal position as in FIG. 11. Thus, the water level in the skimmer basket and in the pond cannot be higher than the top of the inlet 106*a*.

Thus, by rotating the elbow 106 between the vertical and horizontal position, the water level in the pond and in the skimmer can be controlled between the vertical position as shown in FIG. 10 and a horizontal position as shown in FIG. 11.

Numerous changes and modifications can be made to the embodiments shown herein without departing from the spirit and scope of this invention.

The invention claimed is:

1. A decorative pond for pond water which includes:
   a pond area;
   a water feature for filtering and discharging water into said pond area;
   a skimmer construction which includes:
   a housing defining a fixed aperture for receiving pond water and having, a filter for filtering received pond water and a pump for directing filtered pond water to said water feature; and
   an assembly within said housing which defines a movable aperture that cooperates with said fixed aperture to define an inlet opening into said housing for receiving said pond water and for controllably varying the position of the movable aperture relative to the fixed aperture.

2. A decorative pond as in claim 1 wherein the movable aperture is smaller than the fixed aperture.

3. A decorative pond as in claim 1 wherein a water level control is provided in association with the housing which includes a discharge element positioned above the fixed aperture so as to receive water in said housing.

4. A decorative pond for pond water which includes:
   a pond area;
   a water feature for filtering discharging water into said pond area;
   a skimmer construction which includes:
   a housing defining a fixed aperture for receiving pond water and having, a filter for filtering received pond water and a pump for directing filtered pond water to said water feature; and
   an assembly within said housing which defines a moveable aperture that cooperates with said fixed aperture to define an inlet opening into said housing for receiving said pond water and for controllably varying the position of the moveable aperture relative to the fixed aperture, wherein a water level control is provided in association with the housing and includes a discharge element positioned above the fixed aperture so as to receive water in said housing; and wherein said discharge element includes a discharge port and a J-shaped elbow affixed at one end to the discharge port so as to define an outlet and with the other end defining an inlet and which elbow is rotatable about a substantially horizontal axis between a horizontal position slightly above the top of the fixed aperture and a vertical upright position.

5. A decorative pond as in claim 1 wherein:
the fixed aperture is fixed in position relative to the housing; and
the interior assembly is positioned adjacent the fixed aperture and defines a movable aperture which is smaller than the fixed aperture and is movable relative to the fixed aperture so as to define an opening into the housing and permit positional variation of the movable aperture relative to the fixed aperture.

6. A decorative pond as in claim 1 wherein the housing includes a bottom wall below the fixed inlet aperture and a pump positioned on the bottom wall.

7. A skimmer construction for use in a decorative pond to receive pond water which includes:
a housing defining a fixed aperture; and
an internal assembly within said housing and which defines a movable aperture that cooperates with the fixed aperture to define an inlet opening into the housing for receiving the pond water and for controllably varying the position of the inlet opening relative to the fixed aperture.

8. A skimmer construction as in claim 7 wherein:
the fixed aperture is fixed in position relative to the housing; and
the internal assembly is positioned adjacent the fixed aperture, defines a movable aperture which is smaller than the fixed aperture and is movable relative to the fixed aperture so as to define an inlet opening into the housing and permit positional variation of the movable aperture relative to the fixed aperture.

9. A skimmer construction as in claim 8 wherein the internal assembly is further provided with a collection member through which liquid entering the inlet opening passes and which member is fixed in position relative to the fixed aperture.

10. A skimmer construction as in claim 8 wherein said internal assembly includes a body defining the movable aperture which is mounted to the internal assembly adjacent the fixed aperture, and which body is movable relative to the housing.

11. A skimmer construction as in claim 10 wherein the movable aperture body is selectively and fixably securable to said housing so as to position said movable aperture relative to said fixed aperture.

12. A skimmer construction as in claim 11 wherein said body is a plate.

13. A skimmer construction as in claim 12 wherein there is provided an adjustment member in which said plate is vertically and adjustably slidable and to which said body is securable.

14. A skimmer construction as in claim 7 wherein the housing includes a bottom wall below the fixed aperture and a pump positioned on the bottom wall.

15. A skimmer construction as in claim 14 wherein the housing defines a generally horizontal ledge system positioned between the bottom wall and the fixed aperture and there is further provided a filter frame adapted to engage and rest upon the ledge system.

16. A skimmer construction as in claim 15 wherein a portion of said internal assembly is positionable in the filter frame so as to position the movable aperture adjacent the housing.

17. A skimmer construction as in claim 16 wherein a filter rests on and is supported by the filter frame and said filter defines an opening for a pump outlet whereby the pump is positioned between the filter and bottom wall.

18. A skimmer construction as in claim 7 wherein a water level control is provided in association with the housing which includes a discharge element positioned above the fixed aperture.

19. A skimmer construction for use in a decorative pond to receive pond water which includes:
a housing defining a fixed aperture; and
an internal assembly within said housing which defines a moveable aperture that cooperates with the fixed aperture to define an inlet opening into the housing for receiving pond water and for controllably varying the position of the inlet opening relative to the fixed aperture;
wherein a water level control is provided in association with the housing which includes a discharge element positioned above the fixed inlet aperture;
wherein said discharge element includes a discharge port and a "J"-shaped elbow affixed at one end to the discharge port so as to define an outlet with the other end defining an inlet and which elbow is rotatable about a substantially horizontal axis between a substantially horizontal position even with the top of the fixed aperture and a substantially vertical position.

20. A skimmer construction for use in a decorative pond to receive pond water which includes:
a housing defining a fixed aperture; and
an internal assembly within said housing which defines a moveable aperture that cooperates with the fixed aperture to define an inlet opening into the housing for receiving pond water and for controllably varying the position of the inlet opening relative to the fixed aperture; wherein the fixed aperture is fixed in position relative to the housing; and the internal assembly is positioned adjacent the fixed aperture, defines a moveable aperture which is smaller than the fixed aperture and is moveable relative to the fixed aperture so as to define an inlet opening into the housing and permit positional variation of the moveable aperture relative to the fixed aperture;
wherein the internal assembly defines:
a front surface for positioning against the housing wall, which surface defines an aperture for positioning in association with the housing fixed aperture and which defines a lip-like construction above the aperture and along the top edge thereof;
a basketlike debris collector secured to the front surface and extending rearwardly therefrom; and
wherein said front surface and said back lip-like construction cooperate to form a trough-like lower construction along the bottom edge of the front surface below the aperture therein for engaging and maintaining the internal assembly against the housing.

21. A skimmer construction as in claim 20 which includes:
a plate which defines an aperture movably positioned against the front wall, wherein the movable aperture is smaller than the fixed aperture and is movable between an upper position toward the lip and a lower position toward the bottom edge where the bottom of the plate extends into the trough.

22. A skimmer construction for a decorative pond which includes:
- a skimmer housing which defines a fixed pond water receiving aperture;
- an assembly positioned within the skimmer housing and adjacent the fixed aperture;
- which assembly defines a movable pond water receiving aperture that is selectively positionable relative to the fixed aperture;
- with the fixed aperture and movable aperture in combination defining an inlet opening to the skimmer construction for receiving pond water in said housing.

23. A skimmer construction as in claim 22 wherein the movable aperture is smaller than the fixed aperture.

24. A skimmer construction for a decorative pond which include:
- a skimmer housing which defines a fixed pond water receiving aperture;
- an assembly positioned adjacent the fixed aperture which assembly defines a moveable pond-water receiving aperture that is selectively positionable relative to the fixed aperture;
- with the fixed aperture and moveable aperture in combination defining an inlet opening to the skimmer construction for receiving pond water in said housing;
- wherein said assembly further includes an integral debris collecting member positioned to receive pond water from the inlet opening.

25. A construction as in claim 24 wherein said collecting member is an open-topped basket-like member.

* * * * *